United States Patent [19]

Winter et al.

[11] Patent Number: 5,381,349

[45] Date of Patent: Jan. 10, 1995

[54] SYSTEM FOR CALIBRATING A COLOR DISPLAY TO ENABLE COLOR-MATCHING

[75] Inventors: Kirt A. Winter, Escondido; Francis E. Bockman, San Diego, both of Calif.

[73] Assignee: Hewlett-Packard Company, Palo Alto, Calif.

[21] Appl. No.: 84,375

[22] Filed: Jun. 29, 1993

[51] Int. Cl.⁶ ............................................. H04N 1/46
[52] U.S. Cl. .................................... 364/526; 364/553; 364/571.04; 364/571.08; 358/519; 348/179; 348/182
[58] Field of Search ............... 348/182, 675, 179, 576, 348/577, 651; 358/518, 519, 520; 364/553, 526, 571.02, 571.04, 571.05, 571.06, 571.07, 571.08

[56] References Cited

U.S. PATENT DOCUMENTS

| | | | |
|---|---|---|---|
| 3,456,068 | 7/1969 | Wilhelmy | 348/179 |
| 3,757,038 | 9/1973 | Jannery et al. | 348/576 |
| 4,106,846 | 8/1978 | Russin | 348/179 |
| 4,472,736 | 9/1984 | Ushio et al. | 364/526 |
| 4,667,228 | 5/1987 | Kawamura et al. | 358/519 |
| 4,689,669 | 8/1987 | Hoshino et al. | 364/526 |
| 4,860,059 | 8/1989 | Terashita | 364/526 |
| 4,931,864 | 6/1990 | Kawamura et al. | 358/519 |
| 4,954,883 | 9/1990 | Belmares-Sarabis et al. | 348/577 |
| 4,975,862 | 12/1990 | Keller et al. | 364/526 |
| 5,068,810 | 11/1991 | Ott | 364/526 |

Primary Examiner—Emanuel T. Voeltz
Assistant Examiner—Eric W. Stamber

[57] ABSTRACT

A color display screen displays a calibration color patch and a comparison color patch. The calibration color patch manifests a calibration color of a predetermined intensity, and the comparison color patch manifests a comparison color derived from a user determined input value. The system is controlled by a processor and is responsive to a user's indication of a perceived color match between a calibration color patch and a comparison color patch, to determine a transfer function that enables conversion of a value that generated the comparison color to a value assigned to the calibration color. The processor is further responsive to further perceived color matches of first and second color patches with first and second different intensity calibration color patches, respectively, to determine if first and second transfer functions determined for the first and second comparisons are within a transfer function threshold value of each other. If they are, the transfer functions are averaged and employed to calibrate colors transmitted to an attached color printer. If they are not within the transfer function threshold value, an additional comparison test is made. If the resulting transfer function is not within the threshold value, a default color transfer function is substituted.

12 Claims, 4 Drawing Sheets

SYSTEM FOR CALIBRATING A COLOR DISPLAY TO ENABLE COLOR-MATCHING

FIELD OF THE INVENTION

This invention relates to calibration of color in a computer display and, more particularly, to a system for enabling color calibration that enables recovery from user errors.

BACKGROUND OF THE INVENTION

Ideally, computer users wish to have their color displays delivered already calibrated so that displayed colors are consistent with accepted industry standards. Due, however, to variations in display apparatus and operating systems, display-to-display color matching and display-to-printer color matching is often not achieved on initially delivered products.

Systems for calibrating color-display characteristics are known in the prior art. Such systems embody "active" hardware calibrators, "passive" software calibrators and "active" software calibrators. Active calibrators actually change a display's characteristics to a known viewing state, depending upon a user's perception of differences between displayed standard color patches and a variable color patch. Active calibrators are both embodied in software and hardware, with hardware calibrators making use of a sensor that is attached to the screen of the display and enables feedback of correction information to the display. Passive software calibrators detect the characteristics of a color displayed on a screen (through user-interaction) and pass this information to other system components to enable color matching.

Both active and passive software display calibrators rely upon a user's ability to perceive a color match on a screen and to respond in such a manner that the computer which controls the display system is able to arrive at a correction factor. Because these systems depend upon a user's visual acuity and an ability to follow instructions, obtained calibration values are, in many cases, at variance with an accurate calibration value. Accurate calibration of a color display is important when it is desired to have a color printer faithfully reproduce a color image shown on the display. Larger differences in color values between the display and the printer are unacceptable to the discerning user.

While it has been found that user problems in implementing a software-based calibration procedure can be overcome by presenting the user with additional test patterns and repetitions of a calibration procedure, such is not acceptable due to the time demands made on the user—who is much more interested in actually using the the screen.

Accordingly, it is an object of this invention to provide an improved software system for calibrating a color display.

It is another object of this invention to provide a system for calibrating a color display which reacts to a user's error by substituting a default calibration value.

It is yet another object of this invention to provide an improved passive software calibrator that enables color matching of a computer display with colors presented by an attached color printer.

SUMMARY OF THE INVENTION

A color calibration system enables a user to determine a transfer function of a color display. A color display screen displays a calibration color patch and a comparison color patch. The calibration color patch manifests a calibration color of a predetermined intensity, and the comparison color patch manifests a comparison color derived from a user determined input. A user-operable color intensity variation device enables changes to a value to modify the comparison color's intensity. The system further includes memory for storing a transfer function threshold value. The system is controlled by a processor and is responsive to a user's indication of a perceived color match between a calibration color patch and a comparison color patch, to determine a transfer function that enables conversion of a value that generated the comparison color, to a value assigned to the calibration color. The processor is further responsive to plural user inputs indicating perceived color matches of first and second color patches with first and second different intensity calibration color patches, respectively, to determine if first and second transfer functions determined for the first and second comparisons are within the transfer function threshold value of each other. If they are, the transfer functions are averaged and the average value is employed to control colors transmitted to an attached color printer. If they are not within the transfer function threshold value, an additional comparison is made with a third intensity calibration color patch. If additional tests with respect to the transfer function threshold value are not successful, a default color transfer function is substituted.

DETAILED DESCRIPTION OF THE INVENTION

Figure 1:
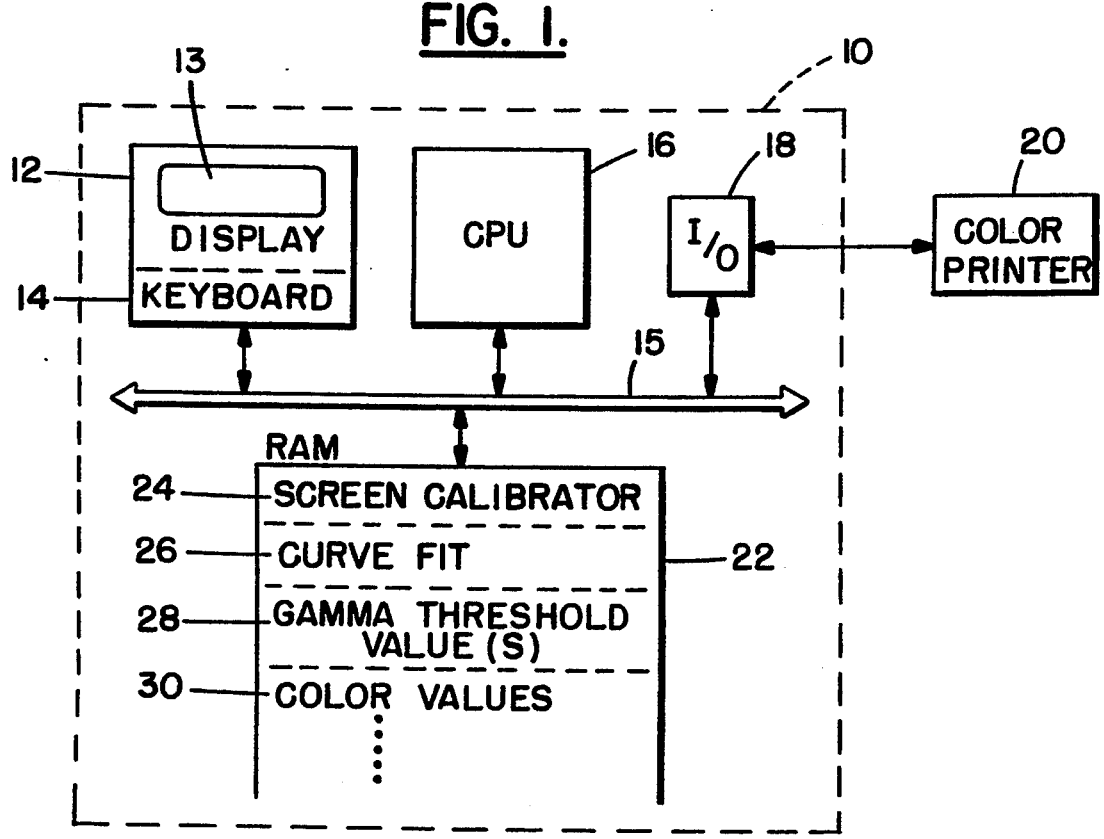
FIG. 1 is a high level block diagram of a computer having a color display and an attached color printer.

Referring now to FIG. 1, a computer 10 includes a color display 12 with a screen 13, attached keyboard 14, and a bus 15 that enables communication between the various elements of computer 10. A central processing unit (CPU) 16 is connected to bus 15 as is an input/output (I/O) module 18. A color printer 20 is connected via I/O module 18 to bus 15. A random access memory (RAM) 22 is also connected to bus 15 and includes a number of software procedures and parameters that are employed to calibrate display screen 13. Those procedures includes a screen calibrator 24 and a curve fit procedure 26. Parameters employed by screen calibrator procedure 24 include stored gamma threshold values (see description below) and color binary values 30 which define various colors used by display 12 in displaying color images on screen 13.

Figure 2:
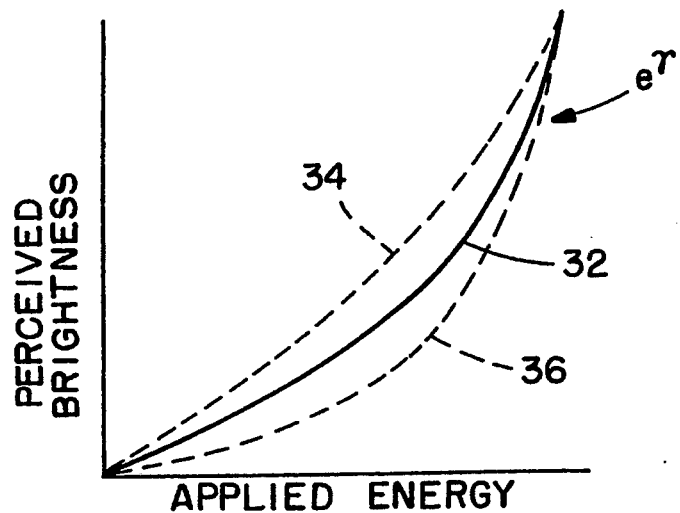
FIG. 2 is a plot of applied energy versus perceived brightness for the display of FIG. 1, showing a normal range of exponential transfer functions that, characterize the display.

The concept of a gamma value will be described in relation to FIG. 2. Curve 32 describes changes in perceived brightness as applied energy is varied to a CRT display screen 13. Curves 34 and 36 illustrate the normal range of variation of curve 32 over many screen displays and indicate the different brightnesses that can occur with equal values of applied energy. Each of curves 32, 34 and 36 is exponential and may be expressed as $x^\gamma$ where x is the normal value of the input. Note that each of curves 32, 34 and 36 exhibits a different gamma ($\gamma$) value, with the respective gamma value defining a "transfer function" for the display that defines its color response to applied energy.

Figure 3:
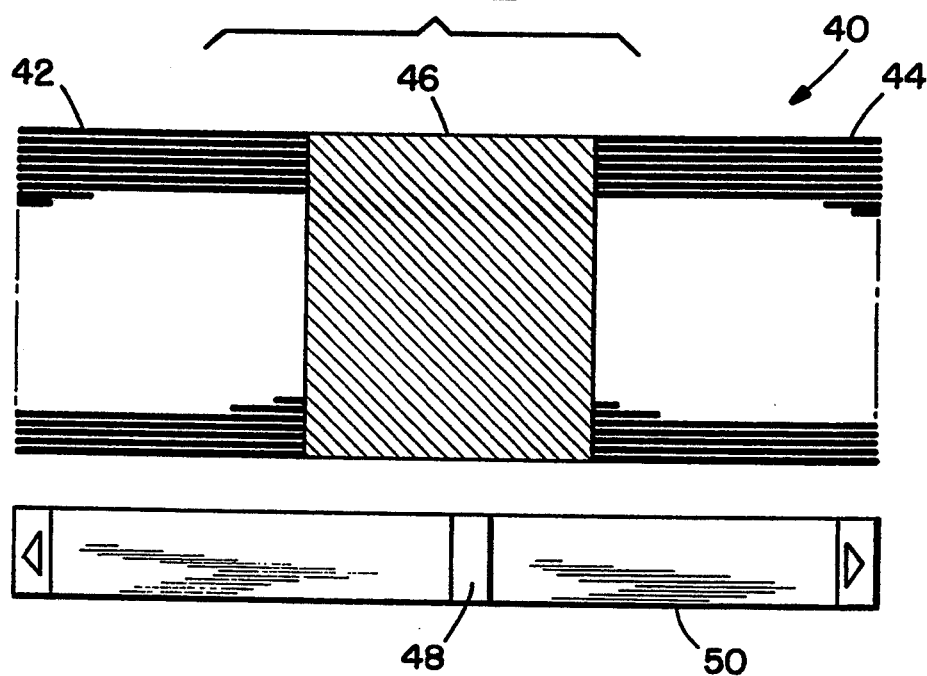
FIG. 3 is a portion of a display screen image showing a color bar, that includes a pair of end calibration color patches and a central comparison color patch, the color bar being employed to enable calibration of the display's screen.

Referring to FIG. 3, the screen calibrator procedure 24 causes a color bar 40 to be displayed on screen 13. Color bar 40 is comprised of two identical calibration color patches 42 and 44 and a comparison color patch 46 positioned therebetween. Each of calibration color patches 42 and 44 comprises interspersed lines of black pixels and color pixels. The color brightness of a calibration color patch can be varied by varying the ratio of black pixel lines to color pixel lines. For instance, a 33% brightness calibration color patch can be created by causing each three lines of pixels to be comprised of a color pixel line followed by two black pixel lines, etc. A 50% color brightness calibration color patch can be created by interleaving color pixel lines and black pixel lines. A 66% brightness calibration color patch is achieved by interspersing two color pixel lines between each black pixel line. The brightnesses of calibration color patches 42 and 44 are always varied together and identically.

Comparison color patch 46 is comprised solely of colored pixels. The brightness of comparison color patch 46 may be varied by a user's movement of indicator 48 along a brightness bar 50. A movement of indicator 48 to the left (e.g., by movement of an underlying cursor) decreases the brightness of comparison color patch 46, whereas a movement of indicator 48 to the right increases the brightness of comparison color patch 46. In effect, the movement of indicator 48 causes CPU 16 to choose color-defining digital values that alter the brightness of the color displayed in comparison color patch 46.

Assuming that the color-defining digital values are 8 bits long, there are, potentially, 0 to 255 separate brightness color levels that can be displayed in comparison color patch 46. Under ideal circumstances, comparison color patch 46 should exhibit a 50% brightness level when indicator 48 is centered along brightness bar 50 and causes a binary value of 127 (or 128) to be accessed by CPU 16 from color values 30 in RAM 22. Under such a circumstance, given 50% brightness values for calibration color patches 42 and 44, the user will perceive no difference in brightness along the entire length of color bar 40. However, due to variations in the gamma of display 12, the accessed value 127 may not result in comparison color patch 46 evidencing a 50% brightness value.

A first embodiment of the invention will now be described that enables calibration of perceived color values in accordance with a determined gamma of display 12. More particularly, the procedure enables a determined gamma value to be employed to convert a binary value that provides a desired level of brightness to a standardized value that may be employed (for instance) in color printer 20 to access identical print color values.

Figure 4:
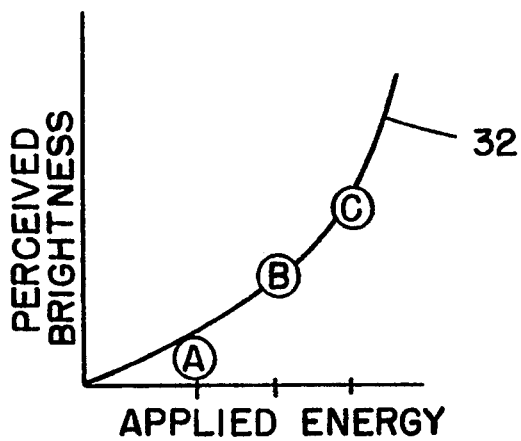
FIG. 4 illustrates three comparison color values, as indicated on a plot of applied energy versus perceived brightness, such comparison color values enabling calibration of the display screen shown in FIG. 1.

Referring to FIGS. 4–8, a first embodiment of the invention will be described. Referring first to FIG. 4, it will be understood that the procedure illustrated in FIG. 8 initially causes calibration color patches 42 and 44 to exhibit a first calibration color level, and subsequently, a second calibration color level. For purposes of example, it will be assumed that the first calibration color intensity is a 33% color brightness and the second calibration color intensity is a 50% color brightness.

The user is first required to adjust comparison color patch 46 to match the 33% color intensity exhibited by calibration color patches 42 and 44. Upon the user perceiving a single color intensity over color bar 40, a "select" action (or equivalent) causes a readout of the binary value that results in the applied energy level that caused the color intensity of comparison color patch 46. A curve fit procedure then determines a curve 60 that fits to the point that is representative of the binary value (e.g. point A in FIG. 5). The gamma value for curve 60 is then determined. The process is repeated for a 50% calibration color level intensity, thereby enabling point B to be determined. A curve fit procedure then enables the gamma for curve 62 to be determined (i.e. point B and curve 62 in FIG. 6). The same procedure can be repeated for a calibration color intensity, allowing curve 64 (FIG. 7) to be determined.

More specifically, once the binary values that result in points A and B are obtained, a curve procedure 26 is accessed from RAM 22 and transfer function curves 60 and 62 (see FIGS. 5 and 6) are fit to the found values. It is to be noted that transfer function curves 60 and 62 differ substantially in shape. (Often, the discrepancy between transfer function curves results from user error in carrying out the calibration procedure, rather than system-based discrepancies). The transfer function gamma values are next compared to determine if they are within a transfer function threshold of each other and if not, the procedure is repeated for a different color intensity (e.g. 66%). If the resulting gamma values, after comparison, do not fall within a prescribed threshold, a default gamma value is enforced.

Figure 8:
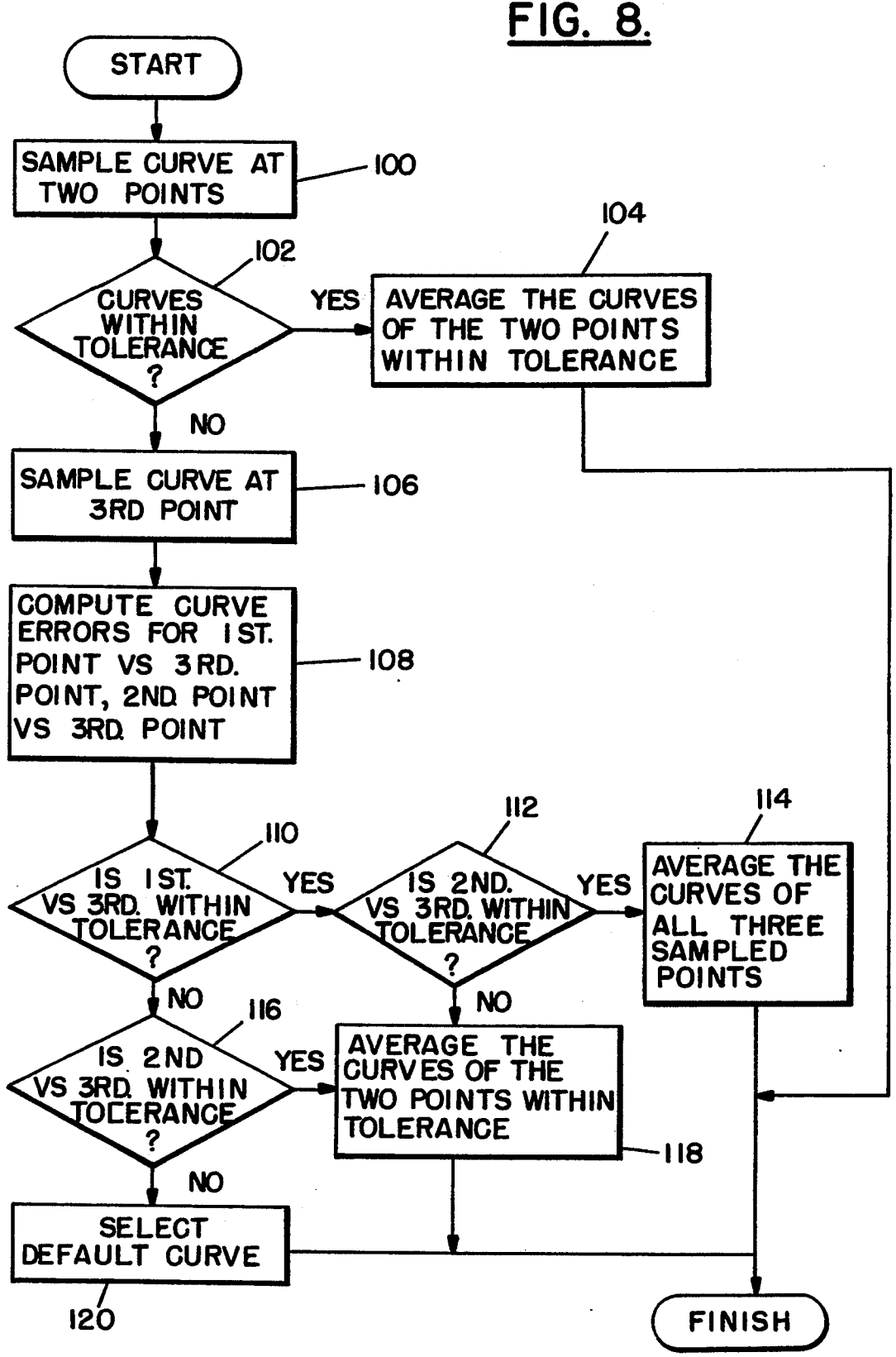
FIG. 8 is a flow diagram illustrating a procedure employed a first embodiment of the invention.

Further details of the above-described procedure are illustrated in the flow diagram of FIG. 8. The above-described color matching for two intensities of the same color comprise the initial steps of the procedure (box 100). Once transfer function curves 60 and 62 (FIGS. 5 and 6) are found which fit to points A and B, the gammas for respective transfer function curves are found and compared with a gamma threshold value 28 stored in RAM 22 (FIG. 1). If the gamma values are within gamma threshold value 28 of each other (decision box 102), the two gamma values are averaged to determine a new transfer function curve having the averaged gamma value (box 104), which curve is then employed as the gamma function calibration factor.

By contrast, if the gamma values for curves 60 and 62 are not within the gamma threshold value, a third point C is sampled (e.g. 66% brightness), and a transfer function curve 64 (FIG. 7) is fit. The gamma value differences for each of transfers function curves 60, 62 and 64 are then computed as the first and third points (A, C)

and the second and third points (B, C). More specifically, the difference in gamma values between curves 60 and 64 and between curves 62 and 64 are respectively determined (box 108). If the gamma value difference between curves 60 and 64 is within the gamma threshold value (decision box 110), it is then determined whether the gamma value difference value between curves 62 and 64 is within the gamma threshold value (decision box 112). If yes, each of curves 60, 62 and 64 is found to be within a gamma threshold value of another transfer function curve. In such case, the gamma values for all curves 60, 62 and 64 are averaged and the resultant gamma value and transfer function curve is used for color calibration purposes (box 114).

Turning back to decision box 110, if curves 60 and 64 are not with the gamma threshold value tolerance, it is next determined whether the second and third curves 62 and 64 are within the gamma threshold tolerance (decision box 116). If yes, it is determined that the first point (A) that resulted in curve 60 must have been chosen in error by the user and only curves 62 and 64 are employed. Their respective gammas are averaged to enable determination of an average gamma value and a transfer function curve results (box 118) that is then used for subsequent color calibrations.

If, as shown in decision box 116, the second and third curves (62, 64) are not within the gamma threshold value tolerance, then it is determined that the user has made further color intensity selection errors and a default gamma value and associated transfer function curve is selected for use in subsequent color calibration actions (box 120). In this manner, transfer function curves that result from erroneous choices by the user are discarded, with the more accurate choices being employed to arrive at a transfer function curve.

Figure 9:
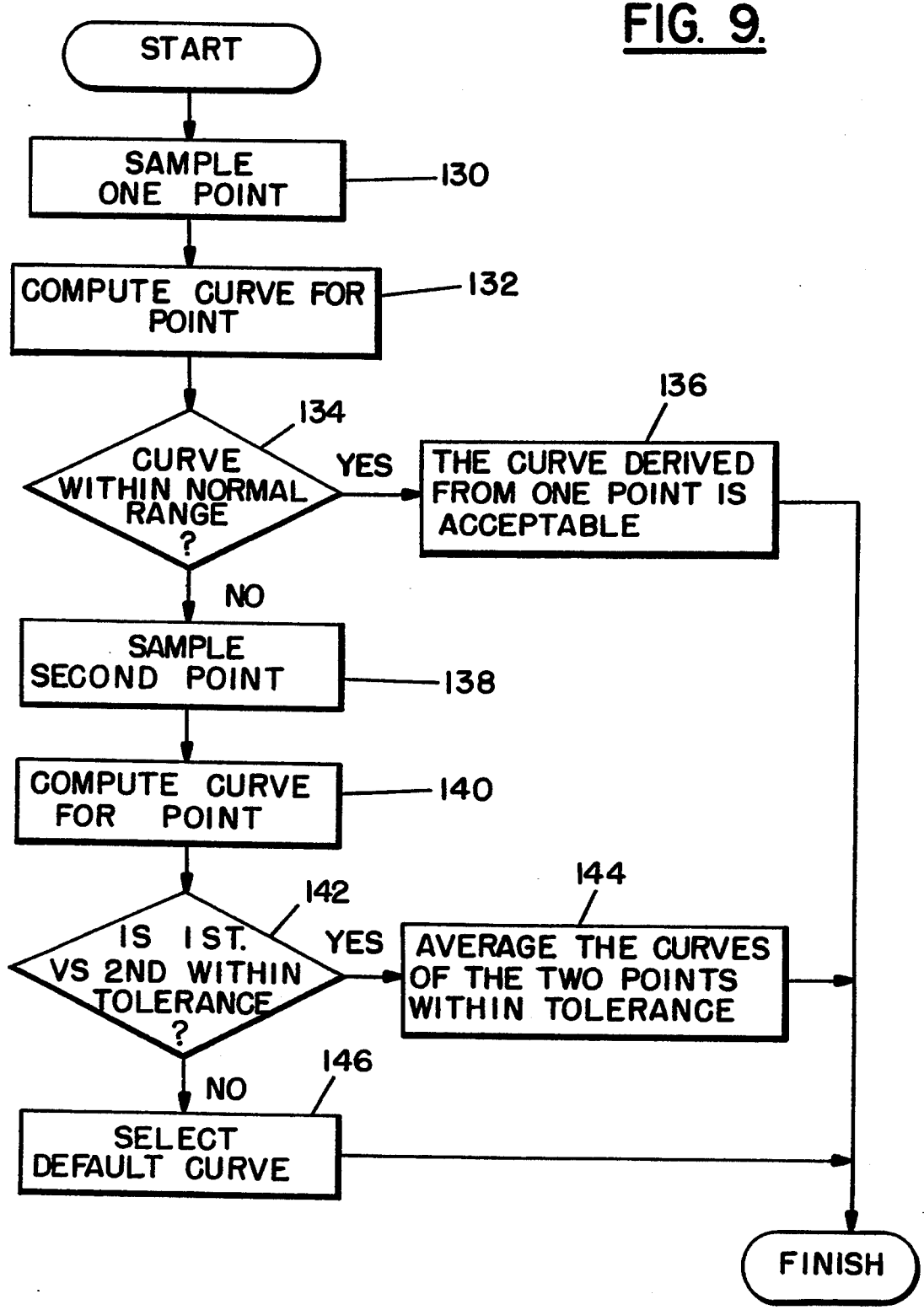
FIG. 9 is a flow diagram illustrating the procedure of a second embodiment of the invention.

Turning to FIG. 9, a somewhat less involved method for transfer function calibration is described. In the procedure shown in FIG. 9, only a single color intensity match need be initially determined by the user (box 130). Such point (e.g., B in FIG. 6) is determined as described above. In specific, screen calibration procedure 24 causes each of calibration color patches 42 and 44 (FIG. 3) to exhibit a 33% intensity value of a chosen color. It will be understood that the 33% intensity value is merely one of choice and may be varied in accordance with screen calibrator procedure 24. The user then modifies the intensity of comparison color patch 46 by appropriate manipulation of indicator 48 until color bar 40 exhibits a uniform color intensity. The user then "selects" the color intensity and the binary value employed by screen calibrator procedure 24 to achieve the indicated comparison color patch intensity is read out as the sampled point (e.g. B in FIG. 6).

Figure 5:
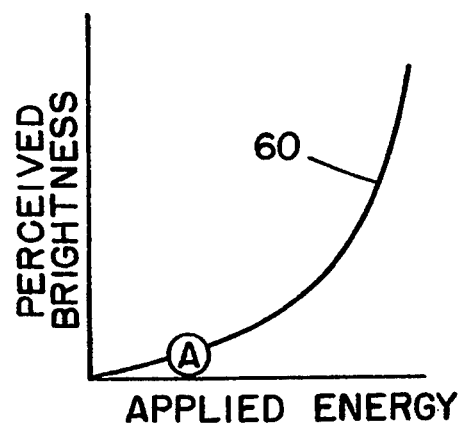
FIGS. 5–7 illustrate plots of applied energy versus perceived brightness and show different shape response curves that result from the color choice values shown in FIG. 4.
Figure 6:
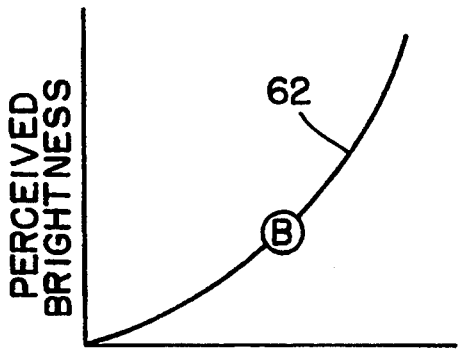
Figure 7:
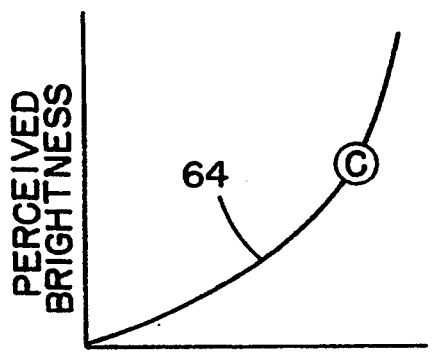

Having derived the binary value for point B, the procedure fits a transfer function curve 62 to point B (box 132). The gamma value for curve 62 is then compared against a gamma threshold value range stored in RAM 22 to determine whether the gamma value for curve 62 falls within the range (decision box 134). If yes, it is determined that the transfer function curve is acceptable (box 136) and the gamma for curve 62 is then employed for subsequent color calibration. If no, the procedure is repeated for a different intensity (box 138). The transfer function curve for the 33% intensity point (A) is then fit as shown in FIG. 5, resulting in curve 60 (box 140). If the gamma values for transfer function curves 60 and 62 are within a gamma threshold value 28 stored in RAM 22, (decision box 142), then those gamma values are averaged to derive a resultant gamma value (and transfer function curve) that is thereafter used for color calibration. If the first and second gamma values are found not to be within the tolerance threshold limit (decision box 142), a default curve is selected, based upon an assumption that the user has made a mistake in the matching of color intensities along color bar 40 (box 146). The default curve is thereafter used for calibration purposes.

It will be understood that the above procedures (FIGS. 8 and 9) have been described for a single color. Under normal circumstances, each procedure would be repeated three times, once for each primary color red, green and blue. Thus, individual transfer function curves would be derived for each primary color, thereby enabling calibration of the respective color value, either before transmittal of chosen color value to a color printer 20 or, by passing the respective gamma calibration values to color printer 20 wherein received color values could be calibrated, in place.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for enabling a user to determine a transfer function of a color display means, said system comprising:

color display means for displaying at least a calibration color patch and a comparison color patch, said calibration color patch manifesting a calibration color of predetermined intensity, said comparison color patch manifesting a user-determined comparison color that matches to a determined binary value;

color intensity variation means for enabling a user to vary an intensity of said comparison color;

memory means for storing a transfer function threshold value; and processor means for operating said color display means to display said calibration color patch with determined calibration color intensities, and responsive to a user's indication of a perceived color match between said calibration color patch and a comparison color patch, to determine a transfer function that enables conversion of a binary value that matches said comparison color to a binary value matching said calibration color, said processor means further responsive to plural user inputs indicating perceived color matches of first and second comparison color patches with first and second different intensity calibration color patches, to determine if first and second transfer functions determined for said first and second comparison color patches are within said transfer function threshold value of each other, and if so, to employ a combination of said first and second transfer functions for calibration of said color display means.

2. The system as recited in claim 1 wherein said combination of said first and second transfer functions is an average of gamma values that describe each transfer function $(x^\gamma)$.

3. The system as recited in claim 2 wherein, upon a determination by said processor that transfer functions for said first and second comparison color patches are not within said transfer function threshold value, said processor is caused to determine a third transfer function for a third intensity comparison color patch and to further determine if said first and third transfer functions are within said transfer function threshold value of each other, and if yes, to further determine if said second and third transfer functions are within said transfer function threshold value of each other and, if yes, to average said first, second and third transfer functions for color calibration purposes.

4. The system as recited in claim 3 wherein upon a determination by said processor that said first and third transfer functions are not within said transfer function threshold value, said processor further determines if said second and third transfer function are within said transfer function threshold value, and if yes, averages said second and third transfer functions for for color calibration purposes.

5. The system as recited in claim 4 wherein upon a determination by said processor that said second and third transfer functions are not within said transfer function threshold value, said processor selects a default transfer function for color calibration purposes.

6. The system as recited in claim 5 wherein said system utilizes a determined or default transfer function to calibrate a color for matching to a color printer color, said system determining a transfer function or default transfer function for each primary color.

7. A system for enabling a user to determine a transfer function of a color display means, said system comprising:
   color display means for displaying at least a calibration color patch and a comparison color patch, said calibration color patch manifesting a calibration color of predetermined intensity, said comparison color patch manifesting a user-determined comparison color intensity that matches to a binary value;
   color intensity variation means for varying said intensity of said comparison color and, as a result, said matching binary value;
   memory means for storing a transfer function threshold range; and
   processor means for operating said color display means to display a calibration color patch with a first determined calibration color intensity and responsive to a user's indication of a perceived color match between said calibration color patch and said comparison color patch, to determine a first transfer function that will enable conversion of a binary value that matches said comparison color to a binary value assigned to said calibration color, said processor means further determining if the first transfer function falls within said transfer function threshold range and, if yes, employing said first transfer function for color calibration.

8. The system as recited in claim 7 wherein upon a determination by said processor means that said transfer function does not fall within said transfer function threshold range, said processor causes a display of a calibration color patch of a second determined calibration color intensity and is further responsive to a user's indication of a perceived color match between said calibration color patch of second intensity and said comparison color patch, to determine a second transfer function, said processor then determining if a difference between said first transfer function and second transfer function falls within said transfer function threshold range, and if yes, employing an average of said first transfer function and second transfer function as a resultant transfer function for color calibration purposes.

9. The system as recited in claim 8 wherein said processor means, upon determining that said difference between said first transfer function and second transfer function does not fall within said transfer function threshold range, causes a default transfer function to be selected for further use in calibration of a color intensity.

10. The system as recited in claim 9 wherein said system utilizes a determined or default transfer function to calibrate a color for matching to a color printer color, said system determining a transfer function or default transfer function for each primary color.

11. A system for enabling a user to determine a transfer function of a color display means, said system comprising:
   memory means for storing a transfer function threshold range; and
   processor means for operating said color display means to display a calibration color patch with a first determined calibration color intensity and responsive to a user's indication of a perceived color match between said calibration color intensity and a comparison color intensity of a comparison color patch, to determine a transfer function that will enable conversion of a binary value that resulted in said comparison color intensity to a binary value assigned to said calibration color intensity, said processor means further determining if said transfer function falls within said transfer function threshold range and if yes employing said transfer function.

12. The system as recited in claim 11 wherein said processor means responds to a determination that plural transfer functions are not within said transfer function threshold range, by substituting a default transfer function, said default transfer function enabling conversion of displayed colors to standard color values for control of a connected printer.

* * * * *